(12) United States Patent
Eckert et al.

(10) Patent No.: US 7,303,055 B2
(45) Date of Patent: Dec. 4, 2007

(54) METHOD AND APPARATUS FOR PROTECTING A FRICTION BRAKE DISC

(75) Inventors: Mark Thomas Eckert, Troy, OH (US); Scott John Szloh, Dayton, OH (US); Jay Gray Peterson, Huber Heights, OH (US)

(73) Assignee: Goodrich Corporation, Charlotte, NC (US)

( * ) Notice: Subject to any disclaimer, the term of this patent is extended or adjusted under 35 U.S.C. 154(b) by 0 days.

(21) Appl. No.: 10/824,900

(22) Filed: Apr. 15, 2004

(65) Prior Publication Data
US 2005/0230196 A1    Oct. 20, 2005

(51) Int. Cl.
*F16D 65/12*    (2006.01)

(52) U.S. Cl. .............................. 188/218 XL; 188/18 A

(58) Field of Classification Search ......... 188/218 XL, 188/218 R, 218 A, 18 A; 192/107 R
See application file for complete search history.

(56) References Cited

U.S. PATENT DOCUMENTS

| | | | | |
|---|---|---|---|---|
| 3,670,858 A | * | 6/1972 | Van Horn | 192/107 R |
| 3,708,042 A | * | 1/1973 | Krause et al. | 188/73.2 |
| 3,731,769 A | * | 5/1973 | Ely | 188/218 XL |
| 3,757,907 A | * | 9/1973 | Crossman et al. | 188/218 XL |
| 3,800,392 A | | 4/1974 | Cook et al. | |
| 3,904,000 A | * | 9/1975 | Berger | 188/218 XL |
| 3,907,078 A | | 9/1975 | Crossman et al. | |
| 3,927,740 A | * | 12/1975 | Zarembka | 188/218 XL |
| 3,972,395 A | | 8/1976 | Jannasch et al. | |
| 4,007,814 A | * | 2/1977 | Berger | 188/218 XL |
| 4,083,434 A | | 4/1978 | Pinter | |
| 4,511,021 A | | 4/1985 | Grider | |
| 4,747,473 A | * | 5/1988 | Bok et al. | 188/73.2 |
| 4,784,246 A | * | 11/1988 | Edmisten | 188/218 XL |
| 4,890,700 A | * | 1/1990 | Guichard | 188/73.2 |
| 5,299,667 A | * | 4/1994 | Hammond | 188/218 XL |

* cited by examiner

*Primary Examiner*—Xuan Lan Nguyen
(74) *Attorney, Agent, or Firm*—Kathleen K. Bowen

(57) ABSTRACT

A protective lug cap assembly for protection of a lug of a friction brake disc comprises a lug cap, and a load bearing fastening device. The disc has a periphery, with a plurality of circumferentially spaced slots, separating a plurality of circumferentially spaced lugs. The slots are separated by a distance, and disposed for engagement by a spline of a torque device. Each of the slots have two generally radially extending wall portions, wherein each wall portion has a top, a bottom, and opposing sides, and a bottom surface extending between and interconnecting the wall portion bottoms. The lug cap has a lug cap face, wherein the lug cap covers one of the slot wall portions and extends circumferentially away from the slot on the slot wall top and the slot wall opposing sides, covering a portion of the lug. The lug cap face is a portion of the lug cap which covers the slot wall portion. The load bearing fastening device is operative to fasten the lug cap to the lug, such that said lug cap face does not contact the slot wall portion.

27 Claims, 6 Drawing Sheets

METHOD AND APPARATUS FOR PROTECTING A FRICTION BRAKE DISC

BACKGROUND

The present invention is in the field of friction braking systems. More specifically this invention relates to multiple disc brake systems wherein the discs have slots on their periphery which are used to engage splines.

In brake assemblies which employ a number of brake discs which are alternately splined to the wheel and the axle, the discs are stressed by contact with the splines. This stress can lead to deterioration of the discs periphery. This is especially apparent when the discs are of a carbon composition (as contrasted with the use of steel to form the discs). Prior art has tried to protect the lug portion of the discs (the peripheral portion between the spline engaging slots) from this stress by covering the slots such that the splines contact the covering, instead of contacting the disc directly. For example U.S. Pat. No. 4,511,021 by Grider discloses inserts for this slot. The disclosed insert is flush with the slot, and therefore transfers force directly to the slot walls.

Besides the stress on the discs due to the engagement with the splines, the discs can also deteriorate due to thermal oxidation and catalytic oxidation. Prior art methods have tried to protect the lug portions of the discs by covering the lugs in various ways. For example, U.S. Pat. No. 3,972,395 by Jannasch et al covers the lugs with a woven carbon cloth, which is cured on. An insert is then added to cover the slot portion. U.S. Pat. No. 4,083,434 by Pinter comprises larger segments of protective cover, which cover the lug portion and the slot portion in one piece. Both of these designs also contact the slot wall portions, and thus transfer loads directly to the slot walls.

Prior art methods have also covered the log portion with a U-shaped cap, riveted to the lug, which had a slight overhang to keep the spline from wearing the slot wall. However, the spline would wear away, or deform this overhang in use, leaving no protection for the slot wall.

Tests have shown that the disc carbon material is much stronger when loaded via rivets or other fastening device, instead of being loaded via the slot walls. Therefore a lug protection method and apparatus is desired which would protect the lug from thermal and catalytic oxidation while at the same time protecting the lug from stress loads by not loading the slot wall.

SUMMARY OF THE INVENTION

A protective lug cap assembly for protection of a lug of a friction brake disc comprises a lug cap, and a load bearing fastening device. The disc has a periphery, with a plurality of circumferentially spaced slots, separating a plurality of circumferentially spaced lugs. The slots are separated by a distance, and disposed for engagement by a spline of a torque device. Each of the slots have two generally radially extending wall portions, wherein each wall portion has a top, a bottom, and opposing sides, and a bottom surface extending between and interconnecting the wall portion bottoms. The lug cap has a lug cap face, wherein the lug cap covers one of the slot wall portions and extends circumferentially away from the slot on the slot wall top and the slot wall opposing sides, covering a portion of the lug. The lug cap face is a portion of the lug cap which covers the slot wall portion. The load bearing fastening device is operative to fasten the lug cap to the lug, such that said lug cap face does not contact the slot wall portion.

DETAILED DESCRIPTION

Figure 1:
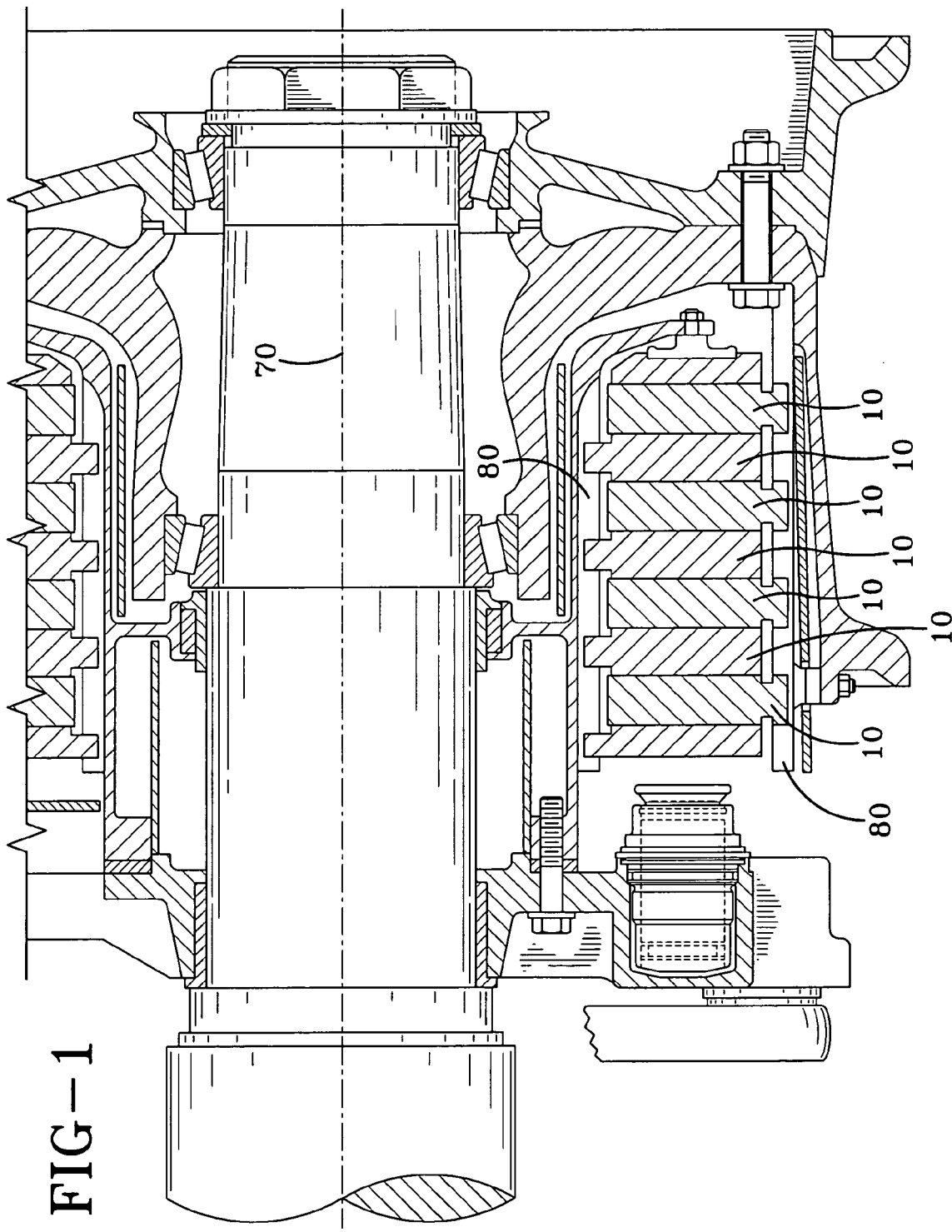
FIG. 1 is a cross sectional view of a disc brake and wheel assembly according to an aspect of the invention.
Figure 2:
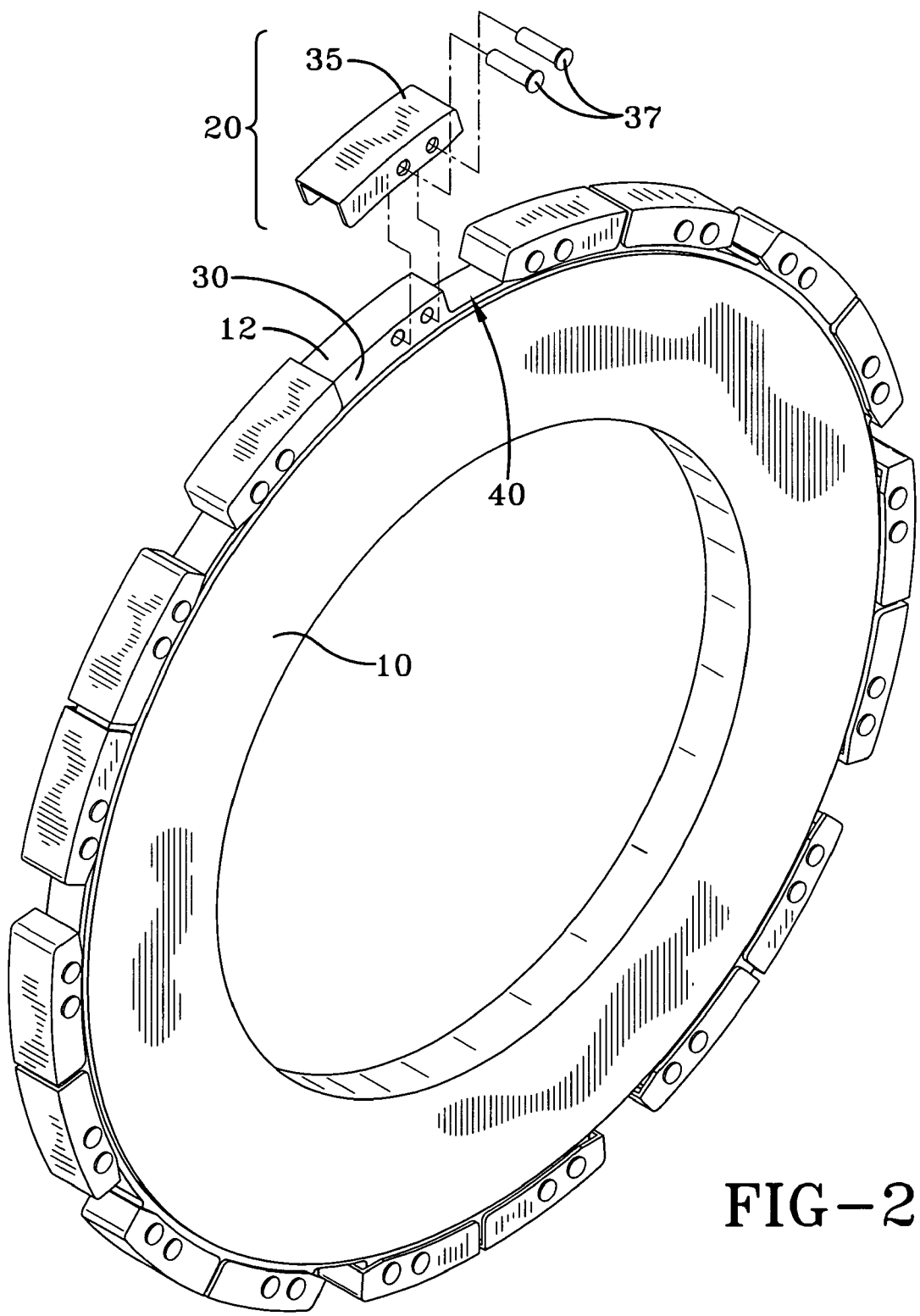
FIG. 2 is an isometric view of a brake disc with protective lug clip according to an aspect of the invention.
Figure 3:
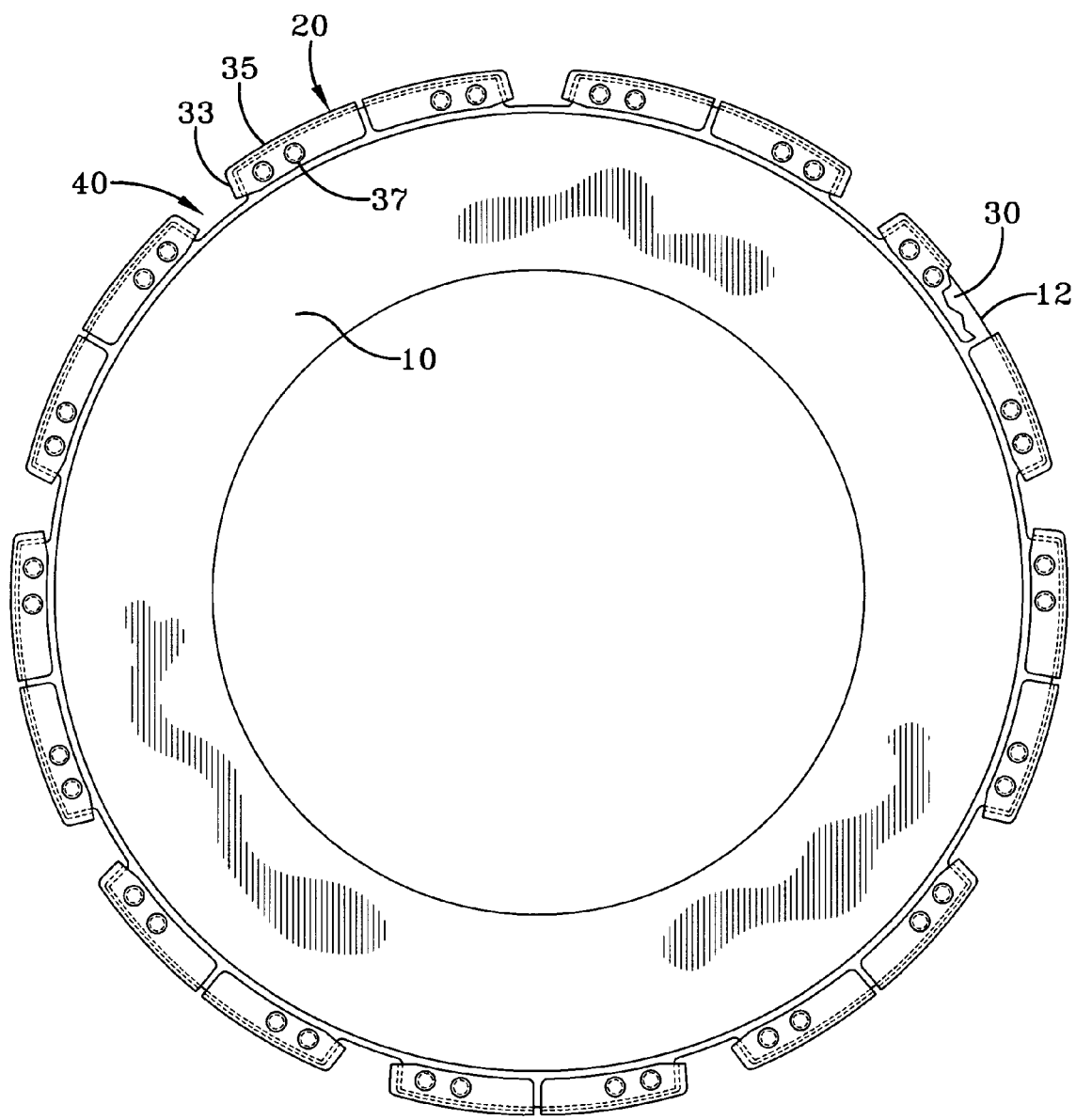
FIG. 3 is a front view of a brake disc with protective lug cap assembly according to an aspect of the invention.
Figure 4:
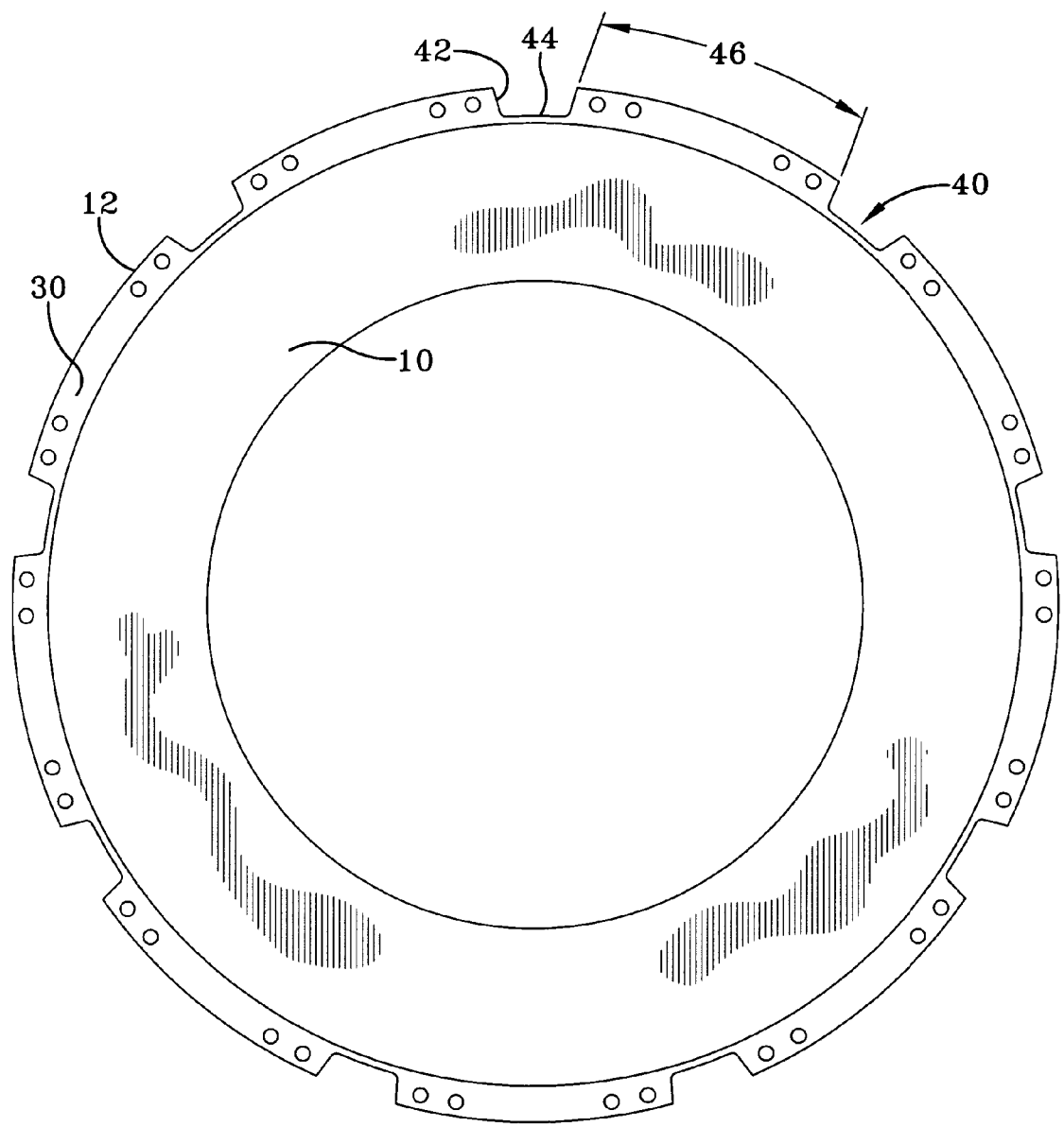
FIG. 4 is a front view of a brake disc according to an aspect of the invention.
Figure 5:
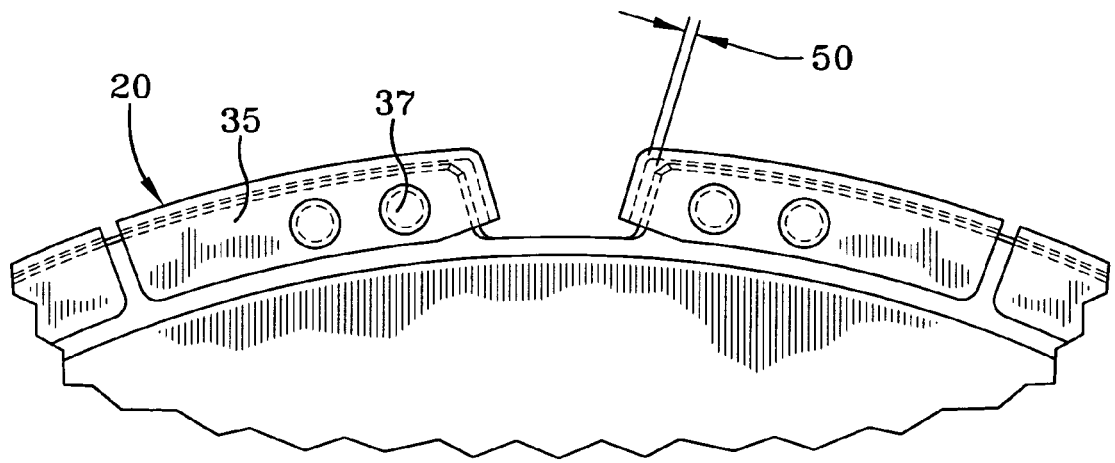
FIG. 5 is a front view of part of a brake disc with protective lug cap assembly according to an aspect of the invention.
Figure 6:
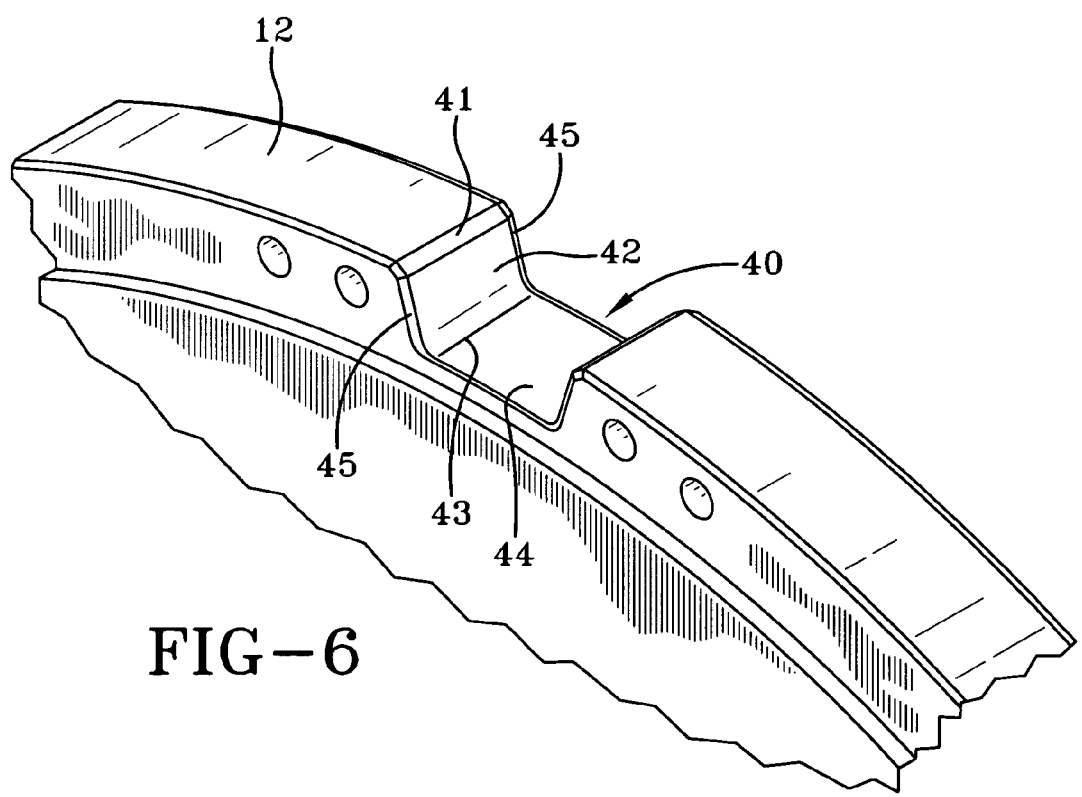
FIG. 6 is an isometric view of part of a brake disc according to an aspect of the invention.
Figure 7:
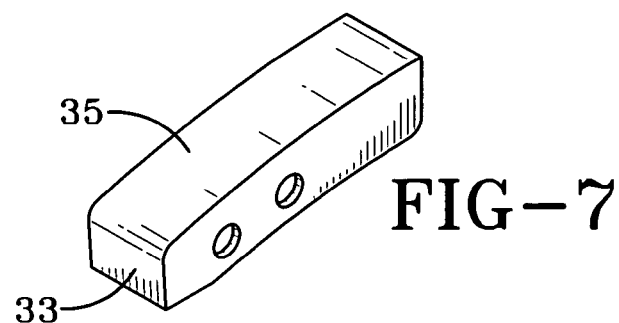
FIG. 7 is an isometric view of a protective lug cap according to an aspect of the invention.
Figure 8:
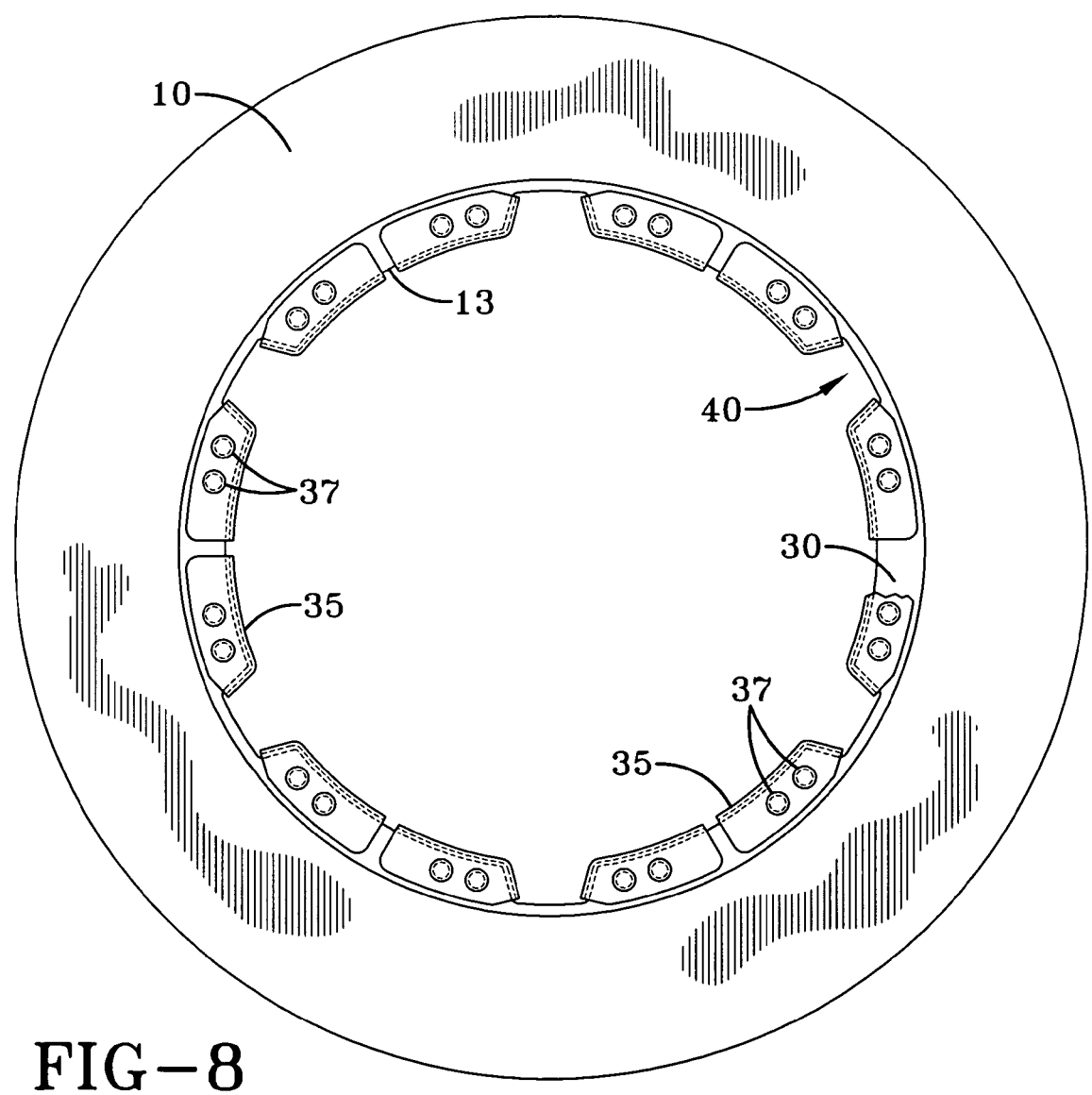
FIG. 8 is a front view of a stator disc according to an aspect of the invention.

Various aspects of the invention are presented in FIGS. 1-8 which are not drawn to scale and in which like components are numbered alike. Referring now to these Figures, according to an aspect of the invention, a protective lug cap assembly 20 for protection of a lug 30 of a friction brake disc 10 is shown. This invention is useful for protection of both a rotor (see FIGS. 2-6) and a stator (see FIG. 8). The rotors rotate about an axis of rotation 70 (see FIG. 1). The disc 10 has a periphery with a plurality of circumferentially spaced slots 40 separating a plurality of circumferentially spaced lugs 30. The slots 40 are disposed for engagement by a spline 80 of a torque device. In the case of a rotor, the periphery with the spline engaging slots is the outer periphery 12. In the case of a stator, the periphery with the spline engaging slots is the inner periphery 13. Each slot 40 has two generally radially extending wall portions 42, wherein the wall portions 42 have a top 41 a bottom 43, and opposing sides 45, and a bottom surface 44 extending between and interconnecting the wall portion bottoms 43. The slots 40 are separated by a distance 46. The protective lug cap assembly 20 comprises a lug cap 35 and a load bearing fastening device 37.

The lug cap 35 covers one of the slot wall portions 42 and extends circumferentially away from the slot 40 on the slot wall top 41 and the slot wall opposing sides 45, covering a portion of the lug 30. The lug cap 35 has a face, 33, wherein the lug cap face 33 is the portion of the lug cap 35 which covers the slot wall portion 42, and is roughly parallel to the slot wall portion 42.

The load bearing fastening device 37 is operative to fasten the lug cap 35 to the lug 30, such that the lug cap face 33 does not contact the slot wall portion 42. According to an aspect of the invention, there is a gap 50 between the lug cap face 33 and the slot wall portion 42. In a preferred embodiment, the gap 50 is approximately 0.04 inches (approx. 0.10 cm). This gap 50 will vary depending on the application, the stresses that will be seen by the lug cap face 33, and the material type used for the lug cap 35. This gap 50 should be large enough such that under most operating conditions, when loaded, the lug cap face 33 does not load the slot wall 42.

The load bearing fasteners 37 may be any suitable fastener known in the art. According to an aspect of the invention, the load bearing fasteners 37 are rivets. The fastening device 37 is fastened approximately parallel to the axis of rotation 70 of a rotor disc. According to a further aspect of the invention, the load bearing fasteners 37 are spaced to share the load between them. One such configuration is shown (FIGS. 2-6), wherein the first load bearing fastener 37 is approximately 0.42 inches (approx. 1.07 cm) from the slot wall 42, and the next load bearing fastener 37 is approximately 0.6 inches (approx. 1.52 cm) from the first load bearing fastener 37. In each case however, the load bearing fasteners 37 should be spaced such that the shear stresses on the brake disc 10 are acceptable.

According to a further aspect of the invention the lug cap 35 extends circumferentially away from the slot 40 approximately one half of the distance 46 to an adjacent slot 40.

According to an aspect of the invention, the lug cap 35 is made of a corrosion and heat resistant material such as a steel alloy, which may be treated or coated to improve these properties. In a preferred embodiment of the invention, the lug cap 35 is comprised of a cobalt alloy. In a further preferred embodiment, the cobalt alloy is specifically Stellite® 21 (a registered trademark of the Deloro Stellite Holdings Corp).

Testing has shown that disc carbon material is much stronger when loaded via a load bearing fastening device 37 such as rivets, compared to when it is loaded via the slot wall portion 42 Therefore the load margin imposed on the lug can be increased by loading via a load bearing fastening device 37.

Thus according to an aspect of the invention, a method of load transfer from a torque device spline 80 to a lug 30 of a friction brake disc 10 to increase the disc's load margin, comprises covering the slot wall portion 42 with a lug cap 35, and mounting the lug cap 35 to the lug 30 with a load bearing fastening device 37, such that a force applied to the lug cap 35 will be transferred to the lug via the fastening device 37, and not via the slot wall portion 42. The lug cap 35 covers one of the slot wall portions 42 and extends circumferentially away from the slot 40 on the slot wall top 41 and the slot wall opposing sides 45, covering a portion of the lug 30. The lug cap 35 has a face, 33, wherein the lug cap face 33 is the portion of the lug cap 35 which covers the slot wall portion 42, and is roughly parallel to the slot wall portion 42.

According to an aspect of the invention, this loading is accomplished by mounting the lug cap 35 such that the lug cap face 33 does not contact the slot wall portion 42.

In a further preferred embodiment, there is a gap 50 between the lug cap face 33 and the slot wall portion 42, and the gap 50 is approximately 0.04 inches.

While the invention has been explained in relation to its preferred embodiments, it is to be understood that various modifications thereof will become apparent to those skilled in the art upon reading the specification. Therefore, it is to be understood that the invention disclosed herein is intended to cover such modifications as fall within the scope of the appended claims.

We claim:

1. A protective lug cap assembly for protection of an individual lug of a friction brake disc, wherein said disc has a periphery, and wherein said disc periphery has a plurality of circumferentially spaced slots, separating a plurality of circumferentially spaced lugs, wherein said slots are separated by a distance and disposed for engagement by a spline of a torque device, each of said slots having two generally radially extending wall portions, wherein said wall portions have a top, a bottom, and opposing sides, and a bottom surface extending between and interconnecting said wall portion bottoms comprising:

a lug cap having a lug cap face, wherein said lug cap covers only one of said slot wall portions and extends circumferentially away from said slot on said slot wall top and said slot wall opposing sides, covering a portion of the lug, and wherein said lug cap face is a portion of the lug cap which covers said slot wall portion, wherein said lug cap face is relatively parallel to said slot wall;

a load bearing fastening device operative to fasten the lug cap to the individual lug, such that said lug cap does not contact said slot wall portion, and wherein said lug cap face is separated from said slot wall portion by an air gap.

2. The protective lug cap assembly of claim 1 wherein said lug cap extends circumferentially away from said slot approximately one half of the distance to an adjacent slot.

3. The protective lug cap assembly of claim 1 wherein said periphery is an outer periphery.

4. The protective lug cap assembly of claim 1 wherein said periphery is an inner periphery.

5. The protective lug cap assembly of claim 1 wherein said lug cap is comprised of a steel alloy material.

6. The protective lug cap assembly of claim 1 wherein said lug cap is comprised of a cobalt alloy material.

7. The protective lug cap assembly of claim 1 wherein said lug cap is comprised of a cobalt alloy, specifically Stellite® 21, material.

8. The protective lug cap assembly of claim 1 wherein said air gap is approximately 0.04 inches.

9. The protective lug cap assembly of claim 1 wherein said load bearing fastening device comprises rivets, wherein said rivets are installed approximately parallel to a radial plane of the disc.

10. A method of protecting lugs of a friction brake disc wherein said disc has a periphery, and wherein said disc periphery has a plurality of circumferentially spaced slots, separating a plurality of circumferentially spaced lugs, wherein said slots are separated by a distance and disposed for engagement by a spline of a torque device, each of said slots having two generally radially extending wall portions, wherein sold wall portions have a top, a bottom, and opposing sides, and a bottom surface extending between and interconnecting said wall portion bottoms, the method comprising the steps of:

covering each of said slot wall portions and each associated lug with a lug cap, wherein said lug cap has a lug cap face wherein said lug cap covers only one of said slot wall portions and extends circumferentially away from said slot wall portion on said slot wall top and said slot wall opposing sides, covering a portion of the associated lug, and wherein said lug cap face is a portion of the lug cap which covers said slot wall portion, wherein said lug cap face is relatively parallel to said slot wall; and, mounting said lug cap to said lug with a load bearing fastening device, such that said lug cap face does not contact said slot wall portion, and wherein said lug cap, face is separated from said slot wall portion by an air gap.

11. The method of protecting lugs of a friction brake disc of claim 10 wherein each said lug cap extends circumferentially away from said slot approximately one half of the distance to an adjacent slot.

12. The method of protecting lugs of a friction brake disc of claim 10 wherein said periphery is an outer periphery.

13. The method of protecting lugs of a friction brake disc of claim 10 wherein said periphery is an inner periphery.

14. The method of protecting tugs of a friction brake disc of claim 10 wherein each said lug cap is comprised of a steel alloy material.

15. The method of protecting lugs of a friction brake disc of claim 10 wherein each said lug cap is comprised of a cobalt alloy material.

16. The method of protecting lugs of a friction brake disc of claim 10 wherein each said lug cap is comprised of a cobalt alloy, specifically Stellite® 21, material.

17. The method of protecting lugs of a friction brake disc of claim 10 wherein said air gap is approximately 0.04 inches.

18. The method of protecting lugs of a friction brake disc of claim 10 wherein said load bearing fastening device comprises rivets, wherein said rivets are installed approximately parallel to a radial plane of the disc.

19. Method of load transfer from a torque device spline to an individual lug of a friction brake disc to increase the disc's load margin, wherein said disc has a periphery, and wherein said disc periphery has a plurality of circumferentially spaced slots, separating a plurality of circumferentially spaced lugs, wherein said slots are separated by a distance and disposed for engagement by said torque device spline, each of said slots having two generally radially extending wall portions, wherein said wall portions have a top, a bottom, and opposing sides, and a bottom surface extending between and interconnecting said wall portion bottoms, the method comprising the steps of:

covering each of said slot wall portions with a lug cap wherein said lug cap has a lug cap face, wherein each said lug cap covers only one of said slot wall portions and extends circumferentially away from said slot wall portion on said slot wall top and said slot wall opposing sides, covering a portion of the lug, and wherein said lug cap face is a portion of the lug cap which covers said slot wall portion wherein said lug cap face is relatively parallel to said slot wall; and, mounting said lug cap to said individual lug with a load bearing fastening device, such that said lug cap face does not contact said slot wall portion, and wherein said lug cap face is separated from said slot wall portion by an air gap.

20. The method of claim 19 wherein said lug cap extends circumferentially away from said slot approximately one half of the distance to an adjacent slot.

21. The method of claim 19 wherein said periphery is an outer periphery.

22. The method of claim 19 wherein said periphery is an inner periphery.

23. The method of claim 19 wherein said lug cap is comprised of a steel alloy material.

24. The method of claim 19 wherein said lug cap is comprised of a cobalt alloy material.

25. The method of claim 19 wherein said lug cap is comprised of a cobalt alloy, specifically Stellite® 21, material.

26. The method of claim 19 wherein said air gap is approximately 0.04 inches.

27. The method of claim 19 wherein said load bearing fastening device comprises rivets, wherein said rivets are installed approximately parallel to a radial plane of the disc.

* * * * *